United States Patent [19]

Sliger et al.

[11] Patent Number: 4,634,582

[45] Date of Patent: Jan. 6, 1987

[54] SULFUR DIOXIDE REMOVAL PROCESS

[75] Inventors: A. Glenn Sliger; James J. O'Donnell; W. Ronald Cares, all of Houston; Aldrich H. Northup, Jr., Katy, all of Tex.

[73] Assignee: The M. W. Kellogg Company, Houston, Tex.

[21] Appl. No.: 799,052

[22] Filed: Nov. 18, 1985

[51] Int. Cl.$^4$ .................. C01B 17/00; C01B 17/02
[52] U.S. Cl. .................................... 423/243; 423/575
[58] Field of Search ............... 423/242 A, 242 R, 243, 423/244 A, 575

[56] References Cited

U.S. PATENT DOCUMENTS

| | | | |
|---|---|---|---|
| 927,342 | 7/1909 | Feld et al. | 423/575 |
| 1,832,448 | 11/1931 | Coleman et al. | 422/162 |
| 1,915,364 | 6/1933 | Harrell | 423/574 R |
| 2,729,543 | 1/1956 | Keller | 423/575 |
| 3,911,093 | 10/1975 | Sherif et al. | 423/574 |
| 4,056,606 | 11/1977 | Germerdonk et al. | 423/575 |
| 4,083,944 | 4/1978 | Chalmers | 423/567 A |
| 4,450,145 | 5/1984 | Klepeis | 423/242 |
| 4,454,101 | 6/1984 | Garrison | 423/242 |

OTHER PUBLICATIONS

Vasan, "The Citrex Process for SO$_2$ Removal", Chemical Engineering Progress, vol. 71, No. 5, May 1975, pp. 61–65.

Korosy, Gewanter, Chalmers, Vansan, "Chemistry of SO$_2$ Absorption and Conversion to Sulfur by the Citrate Process", 167th American Chemical Society National Meeting, Los Angeles, Calif. Apr. 5, 1974.

Primary Examiner—Gregory A. Heller

[57] ABSTRACT

A process for removing sulfur dioxide from a gas stream by absorption in a buffered, aqueous thiosulfate and polythionate solution followed by regeneration of the enriched solution with hydrogen sulfide to form sulfur wherein excess hydrogen sulfide recovered from the regeneration step is introduced to the absorption step to reduce bisulfite concentration in the enriched solution.

11 Claims, 1 Drawing Figure

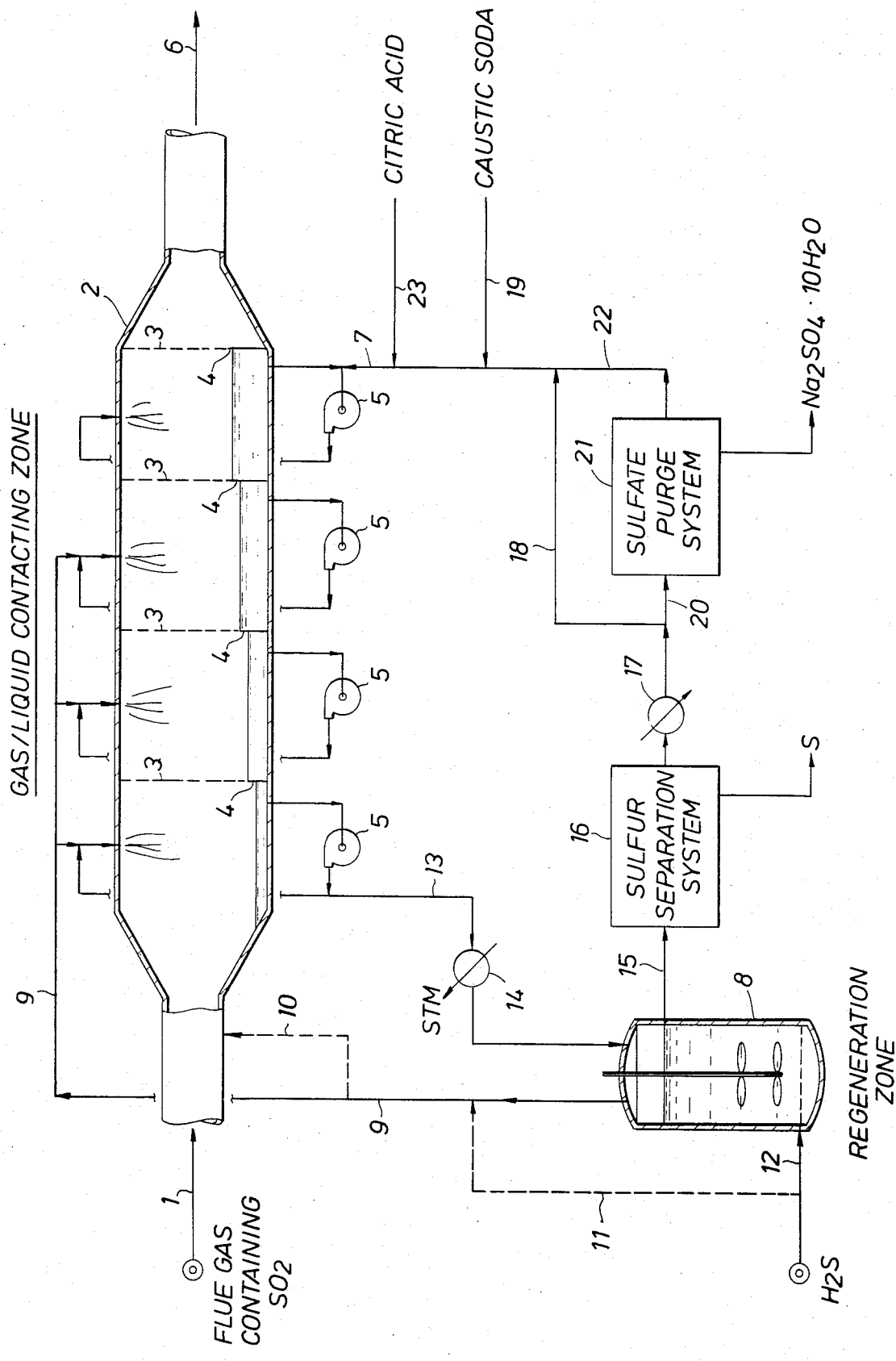

SULFUR DIOXIDE REMOVAL PROCESS

This invention relates to removal of sulfur dioxide from gas streams by absorption in aqueous systems. More particularly, the invention relates to sulfur dioxide absorption in a buffered, aqueous thiosulfate/polythionate solution wherein the resulting $SO_2$-enriched solution is reacted with hydrogen sulfide in a regeneration zone by the overall liquid phase Claus reaction to form sulfur and a regenerated, lean thiosulfate/polythionate solution. Following sulfur removal, the lean solution is returned for further sulfur dioxide absorption.

The aqueous systems are buffered to maintain pH in the broad range between 2.5 and 6.0 and contain thiosulfate/polythionate concentrations that rise and fall as the aqueous system is circulated through various points of the process. Aggregate thiosulfate and polythionate ion concentration varies typically in the range from 0.01 to 3.0 molar with the thiosulfate species predominating.

The aqueous systems are buffered with non-volatile organic acids such as adipic, glycolic, citric, or succinic acids or may be buffered with water soluble salts, for example, alkali metal phosphates in order to maintain pH in a range that is conducive to sulfur dioxide absorption despite accumulation of hydrogen ions in the aqueous system as it becomes enriched with $SO_2$. In the interest of brevity, the following descriptions are for the most part based on use of citric acid as the buffering agent.

In the well known Citrate Process, citrate ions in a citric acid/sodium citrate/thiosulfate/polythionate solution are employed as the buffering agent for reasons of high buffering capacity, chemical stability, low vapor pressure, ease of solution regeneration, and purity of the resulting sulfur product. The Citrate Process was developed in laboratory and pilot plant work sponsored by the U.S. Bureau of Mines and is well described in a paper by Korosy, Gewanter, Chalmers, and Vasan entitled "Chemistry of $SO_2$ Absorption and Conversion to Sulfur by the Citrate Process", American Chemical Society, April 1974. The paper, incorporated herein by reference, recites among other things that solubility of sulfur dioxide in water is limited and declines as hydrogen ions accumulate. However, the combination of hydrogen ions with citrate ions available in the solution maintains pH in the desired range and, therefore, enhances $SO_2$ absorption capacity of the circulating solution. Nevertheless, this absorption capacity still remains limited, albeit at a higher level, by quantitative limitations of the buffering agent which, ultimately, results in increased sulfur dioxide back pressure in the gas/liquid contacting zone. This, in turn, determines the overall liquid circulation rate and absorber size needed for a particular desired level of $SO_2$ removal.

In the known Citrate Process, $SO_2$-enriched absorber liquor is introduced as previously noted to a regeneration zone for reactions with hydrogen sulfide, usually in stoichiometric excess, according to the primary, overall reaction: $SO_2 + 2H_2S \rightarrow 3S + 2H_2O$. In actuality, intermediate reactions involving thiosulfate and polythionates also occur in the regeneration step. Depending upon process conditions, equilibrium amounts of thiosulfate and polythionates remain in the circulating solution at all points of the process. As noted, hydrogen sulfide is usually added to the sulfur reactor of the regeneration zone in stoichiometric excess to ensure maximum sulfur production from the enriched thiosulfate/polythionate/citrate/bisulfite solution with corresponding regeneration of a lean solution which, after sulfur removal, is suitable for recycle to the sulfur dioxide absorber. Excess hydrogen sulfide from the sulfur reactor must be safely disposed and is, therefore, sent to an upstream point in the $SO_2$ generating facility, for example a coal-fired steam boiler, for oxidation and mixture with other sulfur dioxide produced from the fuel being burned. About 10% incremental sulfur dioxide is passed to the $SO_2$ gas/liquid contacting zone as a result of this $H_2S$ recycle.

The known process described is quite satisfactory for removal of $SO_2$ to acceptable levels but is limited by $SO_2$ back-pressure from the amount of bisulfite contained in the buffered, aqueous thiosulfate/polythionate solution within the $SO_2$-gas/liquid contacting zone. Further, large sulfur reactors are required for satisfactory reaction of hydrogen sulfide with bisulfite to form the intermediate thiosulfates and polythionates and, ultimately, the final sulfur product.

It is an object of this invention to improve the absorption and regeneration steps of the known processes.

According to the invention, excess hydrogen sulfide recovered from the regeneration zone is introduced to the $SO_2$-gas/liquid contacting zone employed for absorption of sulfur dioxide. By this technique, bisulfite species in the absorber liquid undergoing enrichment are reacted to form incremental thiosulfate/polythionate in the absorber liquid. This bisulfite depletion reduces sulfur dioxide back pressure in the $SO_2$-gas/liquid contacting zone with the effect of reducing the required gas/liquid contacting capacity and overall circulation rate employed for a given level of sulfur dioxide removal. Absorber liquid in the $SO_2$-gas/liquid contacting zone is tolerant to introduction of a reasonably large amount of hydrogen sulfide recovered from the regeneration zone since sulfur formation by reaction of hydrogen sulfide with thiosulfate/polythionate occurs only when bisulfite species are depleted. Sulfur formation in this step may or may not be detrimental depending upon mechanical design of the absorber. An open, spray type absorber, for example, may be operated with some sulfur present, whereas blockages are likely to occur with use of a packed tower. Preferably, the $SO_2$-gas/liquid contacting zone will be operated with sufficient hydrogen sulfide so that the enriched solution recovered therefrom will have a bisulfite ion concentration in the range from 0 to 0.05 molar. Preferably, the enriched solution will be substantially sulfur-free but may contain up to 1.0 weight percent sulfur. Most preferably, the enriched solution will not contain bisulfite or sulfur in significant amount. In operation of the process of the invention, the buffered, aqueous, lean thiosulfate/polythionate solution introduced to the sulfur dioxide gas/liquid contacting zone will preferably have a a pH between 3.5 and 5.5 and a thiosulfate/polythionate ion concentration between 0.05 and 1.5 molar. The enriched solution recovered from the sulfur dioxide gas/liquid contacting zone will preferably have a corresponding thiosulfate/polythionate ion concentration between 0.1 and 2.0 molar. The $SO_2$-gas/liquid contacting zone is preferably operated at a temperature in the range between 38° and 66° C. for most effective sulfur dioxide absorption. In most instances, the $SO_2$-gas/liquid contacting zone will be operated at or near atmospheric pressure.

External hydrogen sulfide supplied to the regeneration zone for overall Claus reaction with enriched solution recovered from the $SO_2$-gas/liquid contacting zone may be purchased or produced on site by known methods such as by the reaction of sulfur, methane, and steam to form hydrogen sulfide and carbon dioxide. This product gas stream may be used without $CO_2$ removal since the carbon dioxide will not be absorbed in the acidic thiosulfate/polythionate solution and passes harmlessly out of the gas/liquid contacting zone with the cleaned gases. In refinery applications, hydrogen sulfide is typically available as the principal gas feed to a conventional Claus Unit. The Citrate Process is well suited to Claus Unit tail gas cleanup since a small stream of hydrogen sulfide may be bypassed to the regeneration zone of the process of the invention. Of course, the total amount of hydrogen sulfide introduced to the process cannot safely exceed the total sulfur make. Beyond that, however, the amount of hydrogen sulfide excess introduced to the regeneration zone is not critical but is determined preferably to meet the bisulfite ion concentration parameters chosen for the gas/liquid contacting zone. In the regeneration zone, the incremental thiosulfate/polythionate formed in the $SO_2$-gas/liquid contacting zone is reacted with externally supplied hydrogen sulfide to a slurry of elemental sulfur in a resulting buffered, aqueous, lean thiosulfate/polythionate solution. In the course of operational variations, for example changes in $SO_2$ concentration of gas entering the $SO_2$-gas/liquid contacting zone, incremental thiosulfate/polythionate formed in the absorber may not equal the amount of thiosulfate/polythionate reacted to sulfur in the regeneration zone. Under steady state conditions, however, substantially the enriched portion of the recovered, enriched solution reacts to produce the above described slurry. In order to minimize both sulfur level and bisulfite ion concentration in the enriched solution withdrawn from the absorber, we prefer to operate the regeneration zone with a stoichiometric excess between 0.03 and 0.17 moles hydrogen sulfide per mole of sulfur formed and supply no other hydrogen sulfide to the absorber beyond the $H_2S$ recovered from the regeneration zone. In the interest of optimum sulfur production, the regeneration zone should be operated at a temperature between 57° and 77° C.

The remaining process steps of sulfur removal, caustic addition, sulfate purge, and lean solution recycle are conventional and will be briefly discussed in the illustrative embodiment which follows.

DESCRIPTION OF THE DRAWING

Referring now to the drawings, 82,297 normal $m^3$/hr of saturated flue gas containing 553 ppm sulfur dioxide is introduced 1 to the gas inlet of horizontal, cross-flow absorber 2 which is divided into scrubbing stages formed by mist eliminators 3 and liquid weirs 4. Pumps 5 circulate absorber liquor, overall counter-current to gas flow through the absorber. The absorber additionally has an upstream stage (not shown) for quenching the flue gas to 55° C. and removal of particulate matter. Cleaned flue gas containing 52 ppm sulfur dioxide equivalent to an $SO_2$ removal efficiency of 91% is discharged 6 to a gas reheat system (not shown) for venting to the atmosphere.

Scrubber liquor is formed by introduction through line 7 of a mixed component solution in water having a temperature of 55° C., pH of 4.5, and the following composition:

0.22 molar thiosulfate/polythionate
0.52 molar sodium sulfate
0.5 molar citric acid
1.0 molar sodium hydroxide.

0.92 kg-moles/hr of excess hydrogen sulfide recovered from sulfur reactor 8 is introduced via line 9 to the scrubber and is absorbed in the circulating liquor. The excess $H_2S$ may be introduced to the absorber with the incoming $SO_2$-containing gas as shown by line 10. If a staged contactor such as a vertically staged tower or horizontal scrubber (shown in the drawing) is used, we prefer to introduce part of the excess $H_2S$ into two or more of the gas/liquid contacting stages in order to minimize bisulfite concentration throughout the absorber. In this circumstance, that part of the excess $H_2S$ is preferably introduced with two or more of the absorber internal recirculation streams as shown by the continuation of line 9. Line 11 may be employed for addition of supplemental $H_2S$ to the scrubber in the event that the regeneration zone is designed for minimal use of hydrogen sulfide. In this illustrative embodiment, however, the total amount of externally supplied hydrogen sulfide is introduced to sulfur reactor 8 through line 12 at the rate of 3.68 kg-moles/hr.

In the absorber, the entering sulfur dioxide quickly dissolves in the absorber liquor as bisulfite. In prior art systems, bisulfite accumulation in the liquor increases sulfur dioxide back pressure and, therefore, limits the absorption capacity of the gas/liquid contactor. In this exemplary process, however, hydrogen sulfide introduced to the absorber through line 9 quickly reacts with all of the bisulfite species in the liquor to form additional thiosulfate and polythionate species in the liquor and thereby effectively reduces the $SO_2$-back pressure to zero. If too little $H_2S$ is introduced through line 9, the liquor discharged through line 13 to sulfur reactor 8 will contain some bisulfite which will react preferentially to thiosulfate/polythionate and, finally, sulfur in reactor 8. If, on the other hand, too much hydrogen sulfide is introduced to absorber, $H_2S$ reactions with thiosulfate and polythionates will result in sulfur formation in the absorber. The balance is not critical and moderate excursions in either direction may be expected in most process designs. In this embodiment, the amount of hydrogen sulfide introduced to the process through line 12 is selected to provide sufficient hydrogen sulfide in the absorber to react all of the bisulfite in the absorber liquor but none of the thiosulfate and polythionate in the liquor. Accordingly, the liquor discharged through line 13 has the following composition:

0.29 molar thiosulfate/polythionate
0.52 molar sodium sulfate
0.50 molar citric acid
1.0 molar sodium hydroxide.

The enriched thiosulfate/polythionate stream in line 13 is heated to 60° C. by steam heat exchanger 14 and introduced to agitated sulfur reactor 8 which is the central component of the regeneration zone. Designs for suitable sulfur reactors are known in the art and typically involve use of cascade reactors having parallel hydrogen sulfide feed. Similarly, downstream systems for sulfur separation, e.g.—by air flotation and sulfur melting as well as for sodium sulfate purge, are also well known in the art. In brief, a slurry of sulfur in regenerated, lean solution containing thiosulfate, polythionate, citrate, and sulfate ions is discharged from sulfur reactor 8 through line 15 to the sulfur separation system 16 where 4.2 metric tons per day of sulfur is recovered.

The resulting lean solution is then cooled to 55° C. in heat exchanger 17 and recycled to the absorber through lines 18 and 7.

The solution circulating in the process will accumulate sulfate ions from sulfur trioxide entering with the flue gas as well as from a small amount of thiosulfate decomposition during the sulfur recovery step. The resulting sulfuric acid is neutralized by a suitable amount of caustic soda introduced via line 19 to form sodium sulfate which is removed from the process by chilling a purge stream 20 to crystallize and remove sodium sulfate in purge system 21. The remaining solution is then returned through line 22 to the main recirculating lean solution in line 7. Small losses of citrate ion in the process are made up by the addition of citric acid to the system through line 23.

As previously noted, the prior art processes for sulfur dioxide absorption in buffered, aqueous thiosulfate/polythionate solutions followed by a liquid phase Claus reaction step for sulfur production vent excess $H_2S$ from the regeneration step back to the sulfur dioxide production source. The absorber of the prior art processes must, therefore, treat not only the sulfur dioxide originally generated but also incremental sulfur dioxide produced from recycle of excess $H_2S$ from the regeneration step to the $SO_2$ source. More importantly, $SO_2$ absorption in the prior art processes is limited by bisulfite formation in the absorber which, in turn, requires a larger overall liquid circulation rate, a larger absorber, and larger sulfur reactors than used in the present process in order to attain the same level of $SO_2$ concentration in the cleaned gas. A comparison of these factors follows:

|  | Prior Art Process | Process of the Invention |
| --- | --- | --- |
| Net Flue Gas to be treated, $NM^3/hr$ | 78,730 | 78,730 |
| Gross Flue Gas Sulfur Content, kg-mol/hr* | 2.06 | 1.88 |
| Sulfur Production, metric ton/day | 4.2 | 3.9 |
| $SO_2$ in Cleaned Gas, kg-mol/hr | 0.19 | 0.19 |
| Absorber Volume, $m^3$ | 7 | 7 |
| Absorber Gas Rate, $NM^3/hr$ | 82,297 | 82,200 |
| Absorber Liquid Rate, kg/hr | 25,000 | 12,500 |
| Sulfur Reactor Size, $m^3$ | 6.3 | 3.0 |

*The higher sulfur content in the flue gas to be treated by the Prior Art Process results from $H_2S$ recycle back to the flue gas source.

We claim:

1. A process for removing sulfur dioxide from a gas stream with a buffered, aqueous thiosulfate/polythionate solution which comprises:
   (a) introducing sulfur dioxide-containing gas, recovered hydrogen sulfide, and a buffered, aqueous, lean thiosulfate/polythionate solution to an $SO_2$-gas/liquid contacting zone;
   (b) recovering cleaned gas and a buffered, aqueous, enriched thiosulfate/polythionate solution from the $SO_2$-gas/liquid contacting zone;
   (c) introducing the recovered, enriched solution to a regeneration zone;
   (d) introducing externally supplied hydrogen sulfide to the regeneration zone to react a portion of the recovered, enriched solution therein to form a slurry of elemental sulfur in a buffered, aqueous, lean thiosulfate/polythionate solution;
   (e) recovering unreacted excess hydrogen sulfide from the regeneration zone for use in step (a); and
   (f) withdrawing the slurry from the regeneration zone, separating elemental sulfur from the slurry, and recovering the buffered, aqueous, lean thiosulfate/polythionate solution for use in step (a).

2. The process of claim 1 wherein the buffered, aqueous, thiosulfate/polythionate solution is buffered with citrate ions.

3. The process of either claim 1 or claim 2 wherein the buffered, aqueous, enriched thiosulfate/polythionate solution recovered from the $SO_2$-gas/liquid contacting zone contains bisulfite ions in concentration between 0 and 0.5 molar.

4. The process of either claim 1 or claim 2 wherein the buffered, aqueous enriched thiosulfate/polythionate solution recovered from the $SO_2$-gas/liquid contacting zone contains between 0 and 1.0 weight percent elemental sulfur.

5. The process of either claim 1 or claim 2 wherein all of the externally supplied hydrogen sulfide is introduced to the regeneration zone in a stoichiometric excess between 0.03 and 0.17 moles hydrogen sulfide per mole of elemental sulfur formed therein.

6. The process of claim 1 wherein the buffered, aqueous, lean thiosulfate/polythionate solution introduced to the $SO_2$-gas/liquid contacting zone has an aggregate thiosulfate and polythionate ion concentration between 0.05 and 1.5 molar.

7. The process of claim 6 wherein the buffered, aqueous, enriched thiosulfate/polythionate solution recovered from the $SO_2$-gas/liquid contacting zone has an aggregate thiosulfate and polythionate ion concentration between 0.1 and 2.0 molar.

8. The process of claim 2 wherein the buffered, aqueous, lean thiosulfate/polythionate solution introduced to the $SO_2$-gas/liquid contacting zone has a pH between 3.5 and 5.5.

9. The process of claim 1 wherein the $SO_2$-gas/liquid contacting zone comprises an absorber having a plurality of contacting stages and the recovered hydrogen sulfide is introduced to at least two of the contacting stages.

10. The process of claim 9 wherein the recovered hydrogen sulfide is mixed with liquid entering the absorber.

11. The process of either claim 1 or claim 2 wherein the $SO_2$-gas/liquid contacting zone is operated at a temperature between 38° C. and 66° C. and the regeneration zone is operated at a temperature between 57° C. and 77° C.

* * * * *